UNITED STATES PATENT OFFICE.

LOUIS L. JACKSON, OF NEW YORK, N. Y., ASSIGNOR OF ONE-HALF TO ODUS C. HORNEY, OF NEW YORK, N. Y.

PROCESS OF EXTRACTING METALS FROM SILICATES.

1,305,969. Specification of Letters Patent. Patented June 3, 1919.

No Drawing. Application filed June 28, 1916. Serial No. 106,338.

*To all whom it may concern:*

Be it known that I, LOUIS L. JACKSON, a citizen of the United States, residing at New York city, county of Queens, and State of New York, have invented a new and useful Improvement in Processes of Extracting Metals from Silicates, of which the following is a full, clear, and exact description.

The object of my invention is the decomposition of silicates and the extraction therefrom of the metals existing as constituents thereof. The invention is applicable either to the extraction from silicates such as kaolin, soapstone, asbestos, etc., of silica, magnesium, aluminum, etc., or the extraction of the so-called heavy metals, such as nickel, copper, zinc, platinum, etc.

My process may be divided into two steps: first, the digestion process wherein the silicates are treated with alkalis or alkaline earths; and second, the treatment of the product of the digestion. The second treatment will vary with the specific silicates treated.

In order that my invention may be clearly understood, I will illustrate the same by describing the application of the process to different silicates. The first two examples relate to those silicates in which silica, and one or more of such substances as magnesia, alumina, etc., are contained in considerable quantity.

1. I take a certain quantity of kaolin (silicate of aluminum), and digest the same, with a strong solution of caustic soda, for a period of (say) ten hours at a pressure of (say) 200 pounds and a corresponding temperature. Another alkali, or an alkaline earth, may be used in place of caustic soda. I prefer to use a little more than two molecules of caustic soda for each molecule of silica and about two molecules of caustic soda for each molecule of alumina, the purpose being to have sufficient alkali present to bring all the kaolin into solution as silicate of soda and aluminate of soda. I prefer to use the alkali in a solution containing about 20% alkaline oxid. The duration of the digestion, as well as the pressure and temperature, may be varied. Any undecomposed kaolin is removed by filtration.

The solution is treated with sufficient carbonic acid to precipitate the alumina, which is removed by filtration. The silica is removed from the filtrate by saturation with carbonic acid.

Instead of separating the alumina and the silica as described, the original solution may be digested with freshly precipitated silica to precipitate the alumina, and the silica may be recovered from the filtrate with carbonic acid.

Other methods of separating the alumina and silica may be practised.

2. In decomposing soapstone (silicate of magnesium) I digest the same with a strong solution of caustic soda as above described. Other alkalis, as well as alkaline earths, may be used in place of caustic soda. The separation of silica and magnesium is partially made in the digestor, the silica going into solution as sodium silicate, while in the insoluble residue the magnesium is present as a silicate of lower silica content than the original silicate.

The magnesium silicate may be dissolved in any desired acid to produce a marketable salt; or the insoluble residue, when thoroughly washed and dried, may be used, for example, in the manufacture of magnesium chlorid.

3. In the extraction of the so-called heavy metals it will be understood that the methods of treatment must vary with the ore, there being several classes of ore each of which presents a different problem. Thus, the metal may exist as a constituent of a silicate with little or no gangue, or of a silicate which is associated with a silicious gangue, or of a silicate which is associated with a non-silicious gangue or with a mixture of silicates and compounds containing no silica; or the metal may exist as a constituent of an ore which is not a silicate but which is associated with a silicious gangue. It is, of course, impossible to specify all the variations of treatment which would be involved in treating the different ores of these different classes; but the following examples may be given.

In the extraction of the heavy metals it is, in some cases, advantageous, and in other cases even necessary, to preliminarily roast the ore. The process of digestion is essentially the same as that hereinbefore described. That is, the powdered ore is digested with water and not less than sufficient alkali or alkaline earth to combine with all the silica, alumina or other substances that are capable of forming such combination. I prefer to carry on the digestion at a pressure of about 200 pounds. The time required to complete the decomposition will vary not only with the pressure, but also with different ores. With some ores as short a time as five or six hours will suffice, while with other ores the digestion should be prolonged to ten hours or more.

Where an alkaline reagent, such as caustic soda, is used, the soluble silicate, aluminate, etc., is removed by filtration and the washed residue is subjected to such treatment as may be found expedient; the treatment, of course, necessarily varying with different ores.

Thus if the ore contains nickel, this metal, together with some or all of the other heavy metals, will remain in the residue with the magnesium as products readily soluble in dilute acids. Partial separation of the metals may be effected by fractional solution, or the residue may be treated with an excess of acid and the metals separated by any appropriate method. Thus the iron, oxidized if necessary, may be removed by digesting the solution with precipitated calcium carbonate; the greater part of the magnesium, if sulfuric acid is used, may be recovered by crystallization; and the nickel by electrolysis of the magnesium sulfate liquors, etc.

It will be understood that if the filtrate containing the soluble silicate and aluminate is treated with carbonic acid, as described in the first and second examples hereinbefore given, the sodium carbonate recovered is treated with slaked lime to reconvert the same to caustic soda, thus giving plenty of the calcium carbonate which is used, as above described, in removing the iron.

The process may be further illustrated by the treatment of sperrylite, wherein the platinum exists in very small quantity in a complex silicious gangue. The gangue may constitute well over 99% of the whole. By the use of my process the gangue, or the greater part of it, is converted into water soluble and acid soluble products which can be removed, leaving the platinum in a concentrate.

It will be understood that in claiming the use of an alkali I mean to include equivalents thereof such as alkaline earths.

Having now fully described my invention, what I claim and desire to protect by Letters Patent is:—

1. The process of extracting from silicious minerals the heavy metallic constituents thereof which are insoluble in an alkali and water, as compounds containing such metallic constituents, which consists in subjecting the minerals, while mixed with an alkali and water, to heat and pressure, then separating the solution, and then treating the residue to recover, as a soluble salt or salts, the heavier metal or metals.

2. The process of extracting from silicious minerals the heavy metallic constituents thereof which are insoluble in an alkali and water, as compounds containing such metallic constituents, which consists in subjecting the latter, while mixed with an alkali and water, to heat and pressure, then separating the solution to remove the silica and alumina, and separating the silica and the alumina, then subjecting the residue to an acid treatment to form salts of magnesia and any heavy metal sought to be recovered, digesting the solution with precipitated calcium carbonate and removing the iron as a hydrate, separating by crystallization the magnesium salt from the salt of the heavy metal sought to be recovered, and precipitating such heavy metal by electrolysis.

In testimony of which invention, I have hereunto set my hand, at New York city, N. Y., on this 21st day of June, 1916.

LOUIS L. JACKSON.

Copies of this patent may be obtained for five cents each, by addressing the "Commissioner of Patents, Washington, D. C."